V. BAUER.
SPRING TIRE.
APPLICATION FILED OCT. 12, 1909.
961,065.
Patented June 7, 1910.
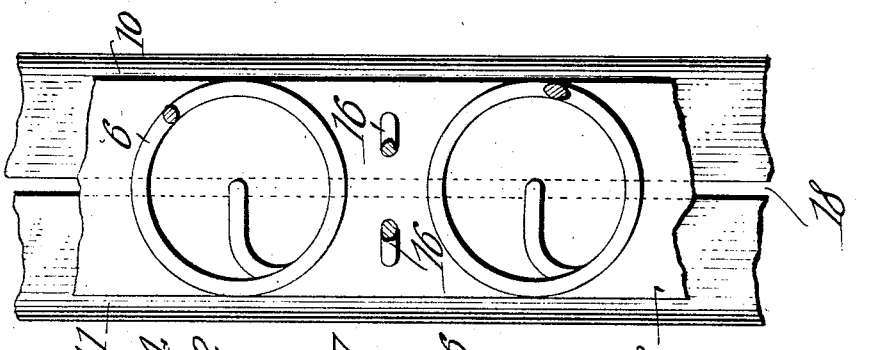
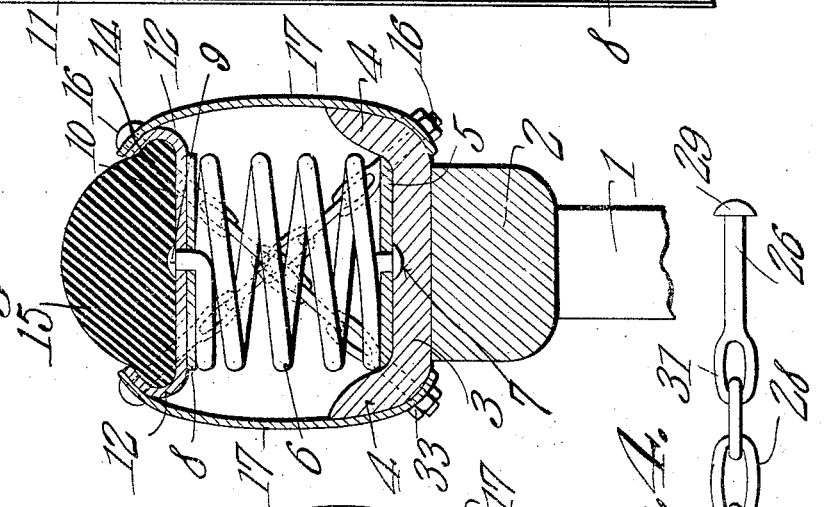
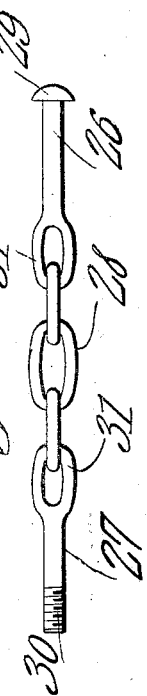
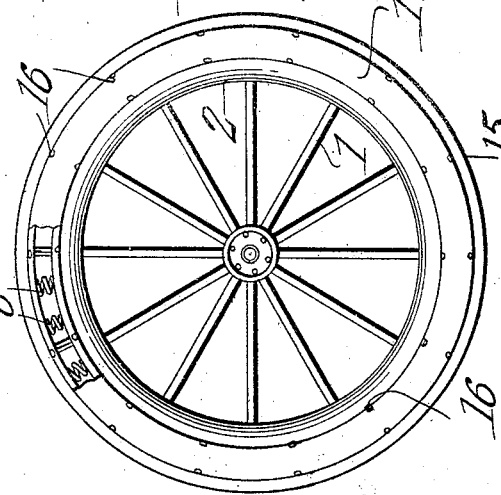
Witnesses
Inventor
Victor Bauer.
By C. A. Snow & Co.
Attorneys

UNITED STATES PATENT OFFICE.

VICTOR BAUER, OF HORTON, KANSAS.

SPRING-TIRE.

961,065.  Specification of Letters Patent.  Patented June 7, 1910.

Application filed October 12, 1909. Serial No. 522,313.

*To all whom it may concern:*

Be it known that I, VICTOR BAUER, a citizen of the United States, residing at Horton, in the county of Brown and State of Kansas, have invented a new and useful Spring-Tire, of which the following is a specification.

The objects of the invention are, generally, the provision in a merchantable form, of a device of the above mentioned class, which shall be inexpensive to manufacture, facile in operation, and devoid of complicated parts; specifically, the provision of a resilient tire adapted to supersede pneumatic structures, and so constructed, that, although adapted to afford proper resiliency, it will yet give sufficient rigidity to the periphery of the wheel; other and further objects being made manifest hereinafter as the description of the invention progresses.

The invention consists in the novel construction and arrangement of parts hereinafter described, delineated in the accompanying drawings, and particularly pointed out in that portion of this instrument wherein patentable novelty is claimed for certain distinctive features of the device, it being understood, that, within the scope of what hereinafter thus is claimed, divers changes in the form, proportions, size, and minor details of the structure may be made, without departing from the spirit or sacrificing any of the advantages of the invention.

Similar numerals of reference are employed to denote corresponding parts throughout the several figures of the drawings.

In the accompanying drawings.—Figure 1 shows my invention in side elevation, parts being broken away better to reveal the structure; Fig. 2 is a transverse section upon an enlarged scale; Fig. 3 is a bottom plan of a portion of the device, parts being broken away; and Fig. 4 is a side elevation of one of the chain bolts whereby component parts of the structure are connected.

In the accompanying drawings, the numeral 1 denotes the spokes of the wheel, carrying the felly 2. Mounted upon the felly and secured thereto in any desired manner is a rim 3, the sides of which are upbent, as denoted by the numeral 4. Extending entirely around the wheel, superposed upon the rim 3, and restrained against lateral movement by means of the sides 4 of the rim, is a plate 5 having along its longitudinal center, a series of openings adapted to receive the inner end of a helical compression spring 6, the inner end of which is butt-ended, as denoted by the numeral 7 or otherwise arranged for engagement between the plate 5 and the rim 3. The wheel is surrounded by a band 8 spaced from the plate 5, and provided along its longitudinal center with a series of openings adapted to receive the outer ends of the springs 6. Mounted upon the band 8 is a tread plate, comprising laterally separable sections 10 and 11, the adjacent edges of which are spaced apart, as denoted by the numeral 18, for the reception of the outer ends of the springs 6, the outer ends of the springs being enlarged as denoted by the numeral 9 to extend laterally upon both of the sections 10 and 11. The edges of the sections 10 and 11 are curved to form outwardly extending clencher flanges 12, to inclose outstanding ribs 14 upon the tire 15, the tire resting upon the sections 10 and 11, and being fashioned from hard rubber or the like. Extending from the rim 3 to the portions 12 of the tread plates, are resilient side plates 17. Chain bolts 16 are extended, at the periphery of the wheel, through the plates 17, through the portions 12 of the sections 10 and 11, through the ribs 14 of the tire, and through the body portions of the sections 10 and 11. At their inner ends, and adjacent the felly 2, the bolts 16 are extended through the portions 4 of the rim and through the inner edges of the plates 17.

By referring to Fig. 2 of the drawings, it will be seen that the chain bolts 16 are disposed in decussate relation; that is, when the tire is viewed in transverse section, the chain bolts are so positioned in the tire that they take the form of the letter X.

As indicated in Fig. 2, and as shown most clearly in Fig. 4, the chain bolts 16 comprise end sections 26 and 27, one of which is headed as denoted by the numeral 29, the other of which is threaded, as denoted by the numeral 30, to receive the nut 33, both of the sections 26 and 27 terminating in eyes 31, connected by links 28.
From the foregoing, it will be seen that the chain bolts 16 constitute a flexible connection between the parts, the chain bolts being adapted to permit inward movement of the outer rim relative to the inner rim, but oppose outward movement of said outer rim beyond the normal position thereof.

From the foregoing it will be seen that I have provided a resilient tire of durable construction, adapted for use either upon light vehicles, or upon the heaviest trucks, or the like.

Having thus described my invention what I claim as new and desire to protect by Letters Patent is:—

1. In a device of the class described, a rim; a plate surrounding the rim; a compression spring having one end passing through said plate and engaged between the rim and the plate; a tread plate comprising laterally separable sections arranged to engage between them the other end of the spring; a tire mounted upon the tread plate and engaged laterally by the sections thereof; and flexible, decussate retaining members extended through the sections, the tire and the rim.

2. In a device of the class described, a rim; a plate surrounding the rim a compression spring having one end passing through said plate and engaged between the plate and the rim; a band provided with an opening to receive the other end of the spring; a tread plate superposed upon the band and comprising laterally separable sections arranged to engage between them the last named end of the spring; a tire laterally engaged by the sections and superposed thereon; resilient side plates connecting the sections with the rim; and flexible retaining members extended through the side plates, the tire, the band, and the rim.

3. In a device of the class described, a rim; a plate surrounding the rim; a compression spring having one end passing through said plate and engaged between the plate and the rim; a band having an opening to receive the other end of the spring; a tread plate comprising laterally separable sections arranged to engage between them the last named end of the spring; a tire laterally engaged by the sections and superposed thereon; resilient side plates uniting the sections with the rim; and flexible, decussate retaining members each extended at one end through one of the side plates, a section of the tread plate, and through the band, and at the other end extended through the rim and the other of the side plates.

In testimony that I claim the foregoing as my own, I have hereto affixed my signature in the presence of two witnesses.

VICTOR BAUER.

Witnesses:
F. H. WILSON,
A. D. INGELS.